(12) United States Patent
Ishiyama et al.

(10) Patent No.: US 11,377,155 B2
(45) Date of Patent: Jul. 5, 2022

(54) COWL TOP STRUCTURE

(71) Applicant: HONDA MOTOR CO., LTD., Tokyo (JP)

(72) Inventors: Yasuhiro Ishiyama, Wako (JP); Hiroyo Miyanaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 75 days.

(21) Appl. No.: 16/830,540

(22) Filed: Mar. 26, 2020

(65) Prior Publication Data

US 2020/0307711 A1  Oct. 1, 2020

(30) Foreign Application Priority Data

Mar. 27, 2019  (JP) .............................. JP2019-059932

(51) Int. Cl.
| | | |
|---|---|---|
| *B62D 25/08* | (2006.01) | |
| *B62D 25/10* | (2006.01) | |
| *B62D 25/16* | (2006.01) | |
| *B62D 29/04* | (2006.01) | |
| *B60S 1/08* | (2006.01) | |

(52) U.S. Cl.
CPC .............. *B62D 25/081* (2013.01); *B60S 1/08* (2013.01); *B62D 25/105* (2013.01); *B62D 25/16* (2013.01); *B62D 29/043* (2013.01)

(58) Field of Classification Search
CPC .... B62D 25/081; B62D 25/105; B62D 25/16; B62D 29/043; B60S 1/08
See application file for complete search history.

(56) References Cited

U.S. PATENT DOCUMENTS

| | | |
|---|---|---|
| 2015/0028629 A1 | 1/2015 | Sasaki et al. |
| 2016/0347375 A1 | 12/2016 | Kaba |
| 2017/0057554 A1 | 3/2017 | Nakamoto |

FOREIGN PATENT DOCUMENTS

| | | |
|---|---|---|
| CN | 104114435 A | 10/2014 |
| CN | 106184403 A | 12/2016 |
| CN | 107097853 A | 8/2017 |
| JP | S60-65173 U | 5/1985 |

(Continued)

OTHER PUBLICATIONS

Office Action received in corresponding Japanese application No. 2019-059932 dated Jan. 26, 2021 with English translation (8 pages).

(Continued)

*Primary Examiner* — D Glenn Dayoan
*Assistant Examiner* — Melissa Ann Bonifazi
(74) *Attorney, Agent, or Firm* — Rankin, Hill & Clark LLP

(57) ABSTRACT

Included are a cowl top arranged on a lower end part of a front windshield; a dash panel provided with a first air intake port for sucking external air under and behind the cowl top, and on one side of the cowl top in a vehicle width direction; a hood arranged in front of the dash panel, and above an engine room; left and right fenders arranged respectively on sides of the cowl top; and left and right cowl sides extending in up-down and front-rear directions respectively on the opposite sides of the cowl top in the vehicle width direction. The right cowl side includes a second air intake port for introducing the external air to under the cowl top. The hood is arranged above the second air intake port. The right fender is arranged outside the second air intake port in the vehicle width direction.

20 Claims, 6 Drawing Sheets

(56) References Cited

FOREIGN PATENT DOCUMENTS

| | | |
|---|---|---|
| JP | H05-37657 U | 5/1993 |
| JP | H09-295589 A | 11/1997 |
| JP | 2002-127941 A | 5/2002 |
| JP | 2003-276642 A | 10/2003 |
| JP | 2006-007982 A | 1/2006 |
| JP | 2008-074202 A | 4/2008 |
| JP | 2015-000671 A | 1/2015 |
| JP | 2015-214304 A | 12/2015 |
| JP | 2017-043320 A | 3/2017 |

OTHER PUBLICATIONS

Office Action received in corresponding CN application No. 202010205011.9 dated Jan. 7, 2022 with English translation (13 pages).

COWL TOP STRUCTURE

CROSS-REFERENCE TO RELATED APPLICATION

This application is based upon and claims priority from the Japanese Patent Application No. 2019-059932, filed on Mar. 27, 2019, the entire contents of which are incorporated herein by reference.

BACKGROUND OF THE INVENTION

1. Field of the Invention

The present invention relates to a cowl top structure.

2. Description of the Related Art

For example, in a cowl top structure disclosed in Japanese Patent Application Publication No. 2017-43320, a cowl reinforcement is attached to an upper end portion of a dash panel, and two end portions of the cowl reinforcement in the vehicle width direction are respectively connected to left and right front pillars. The cowl reinforcement has a closed cross-sectional structure, and includes an air conduct opening (first air intake port) in its rear wall.

SUMMARY OF THE INVENTION

The conventional cowl top structure includes a water drain hole near the air conduct opening. Thus, water swirled up when air is taken in from the water drain hole is likely to be sucked into the air conduct opening.

An object of the present invention is to provide a cowl top structure which is capable of reducing the likelihood that water is sucked into the first air intake port.

The present invention includes: a cowl top arranged on a lower end part of a front windshield; a vehicle body provided with a first air intake port for sucking external air under and behind the cowl top, and on one side of the cowl top in a vehicle width direction; a hood arranged in a front of the vehicle body, and above a power source compartment; a fender arranged on a side of the cowl top; and a cowl side extending in up-down and front-rear directions on another side of the cowl top in the vehicle width direction. The feature is that: the cowl side includes a second air intake port for introducing the external air to under the cowl top; the hood is arranged above the second air intake port; and the fender is arranged outside the second air intake port in the vehicle width direction.

The present invention provides a cowl top structure which is capable of reducing the likelihood that water is sucked into the first air intake port.

DETAILED DESCRIPTION OF THE EMBODIMENTS

An embodiment of the present invention will be hereinafter described with reference to the accompanying drawings depending on the necessity. The same components will be denoted by the same reference signs, and duplicated description will be omitted. The following descriptions will be provided basically based on the front, rear, left, right, up and down from the driver unless otherwise indicated. In addition, a "vehicle width direction" means a "left-right direction."

Figure 1:
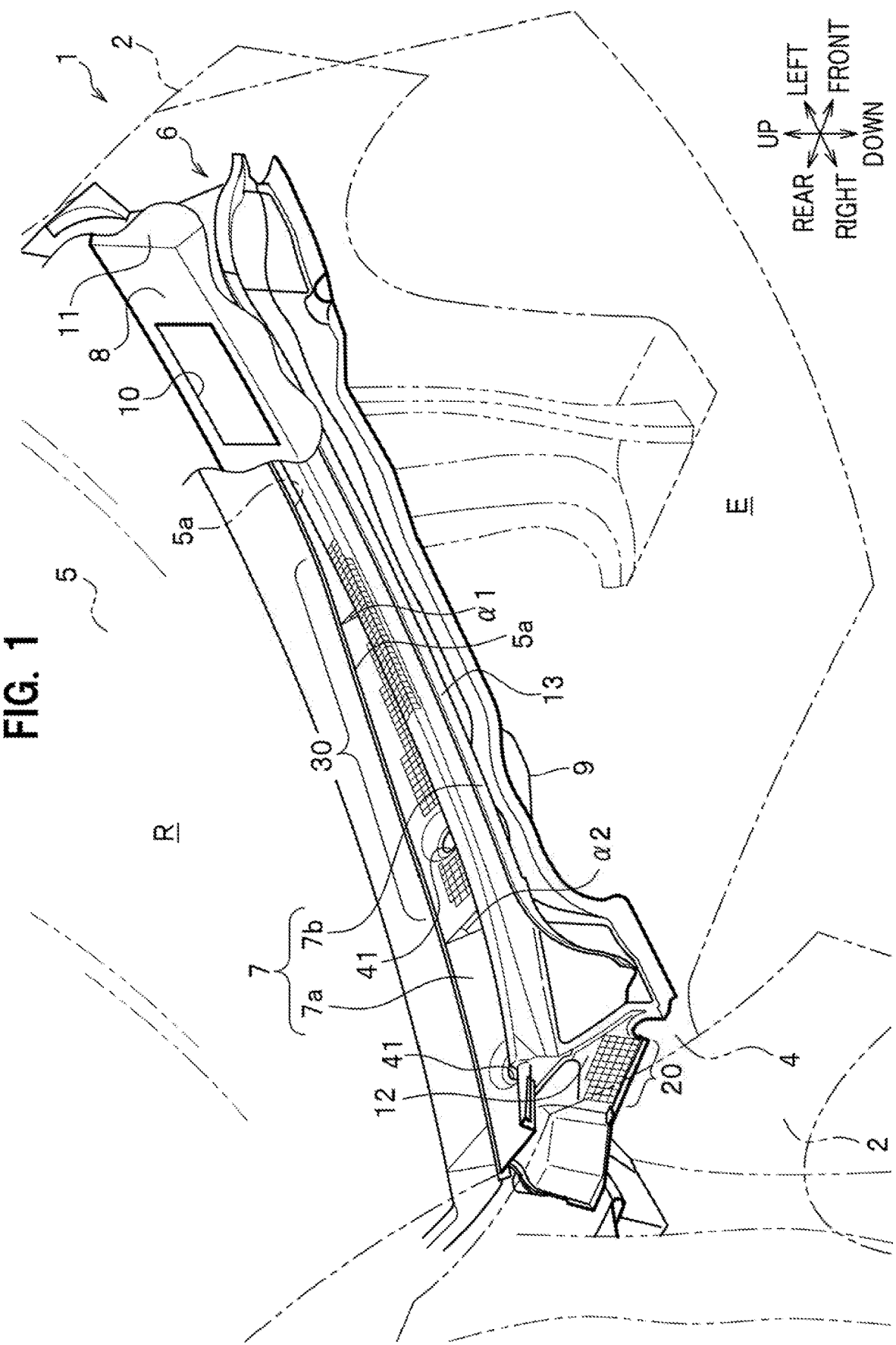
FIG. 1 is a cutaway perspective view for explaining a configuration of a vehicle body front of a vehicle to which a cowl top structure according to an embodiment of the present invention is applied.

FIG. 1 illustrates a vehicle 1 to which a cowl top structure according to the embodiment of the present invention is applied. The vehicle 1 includes an occupant compartment R behind an engine room E which serves as a power source compartment in a vehicle body front.

Left and right fenders 2, 2 are provided on side surfaces of the engine room E, respectively. In addition, an upper surface opening of the engine room E is covered with a hood 4. Furthermore, a front windshield 5 is provided in the front of the occupant compartment R.

A cowl box 6 whose longitudinal direction coincides with the vehicle width direction is arranged between the engine room E and the occupant compartment R.

The cowl box 6 includes, mainly, a cowl top 7 forming an upper surface portion of the cowl box 6 and a cowl lower 9 (see FIG. 4) forming a bottom surface portion of the cowl box 6 while facing the cowl top 7, which both extend along a lower end part 5a of the front windshield 5.

Figure 2:
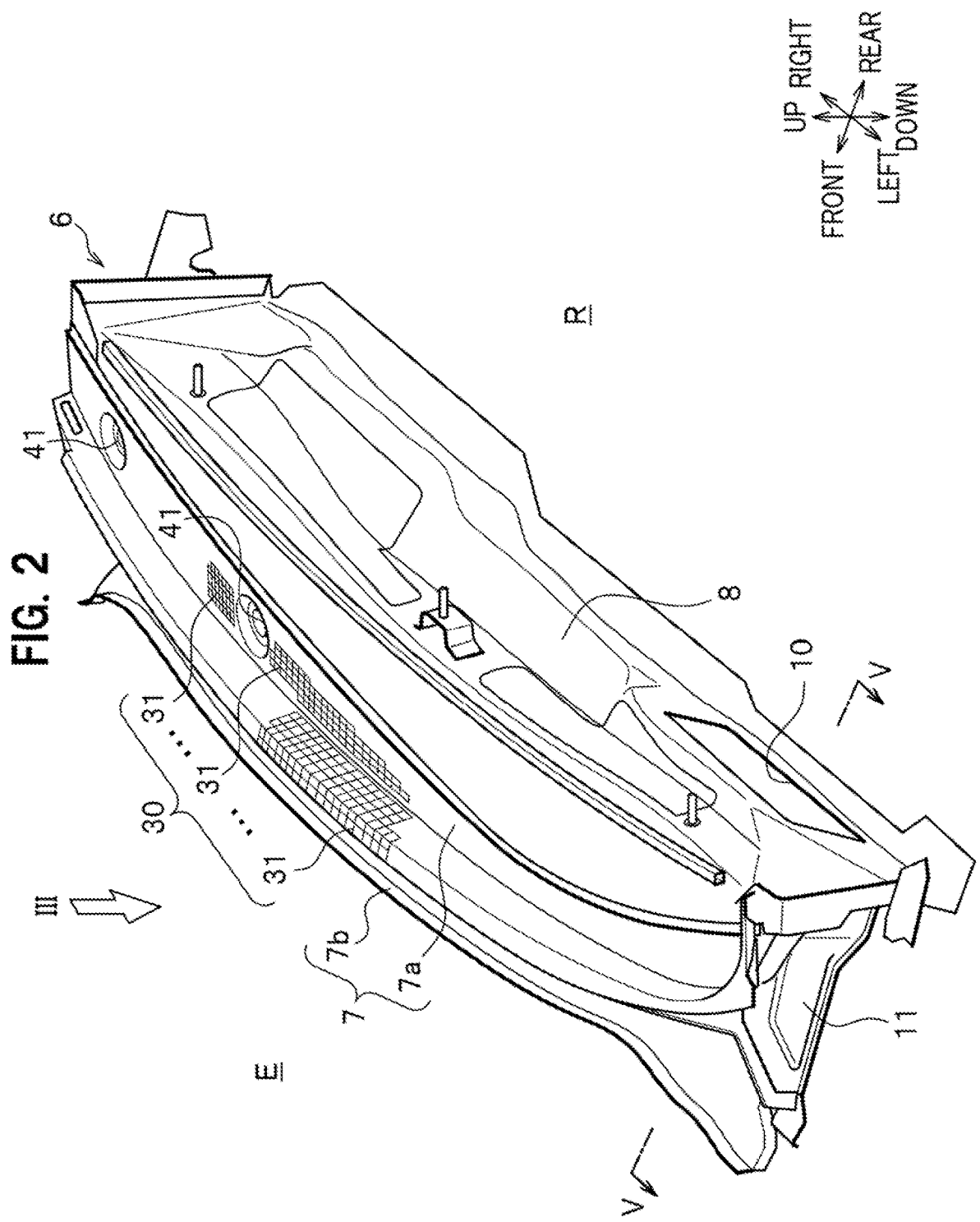
FIG. 2 is a perspective view illustrating how a cowl box in the cowl top structure according to the embodiment looks when viewed diagonally from a left rear the vehicle.

Besides, as illustrated in FIG. 2, the cowl box 6 includes a dash panel 8 under and behind the cowl top 7. The dash panel constitutes a part of a vehicle body while separating the engine room E and the occupant compartment R from each other. The cowl box 6 further includes left and right cowl sides 11, 12 arranged in its left and right sides surfaces, and a cowl front 13 forming its front surface portion, which are both illustrated in FIG. 1. In addition, a cowl front 7b is provided extending integrally from an upper surface part 7a of the cowl top 7 toward the front of the vehicle. Both left and right end portions of the cowl front 7b each have a form which is wide in a vehicle front-rear direction.

Figure 4:
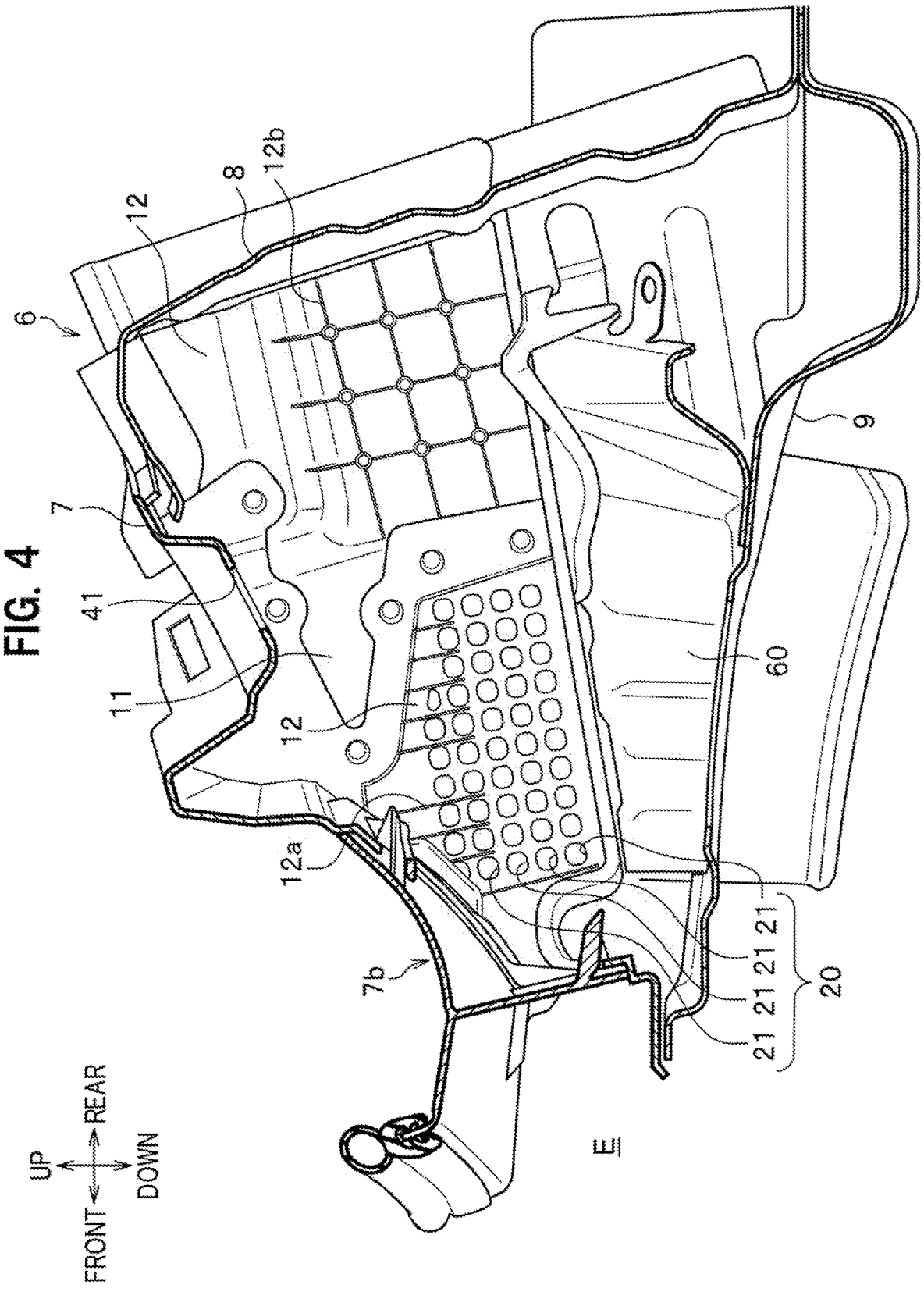
FIG. 4 is a cross-sectional view of a configuration of the cowl box in the cowl top structure according to the embodiment, taken along the IV-IV line of FIG. 3.

Furthermore, as illustrated in FIG. 4, the cowl box 6 is formed in the shape of a hollow box whose vertical cross-sectional shape in the front-rear direction is substantially trapezoidal with the cowl top 7, the dash panel 8, the cowl lower 9, the left and right cowl sides 11, 12 (see FIG. 5) connected to the cowl box 6 from its surroundings.

Moreover, as illustrated in FIG. 2, a first air intake port 10 serving as a first air intake port is provided on one side (vehicle left side) of the dash panel 8 in the vehicle width direction. The first air intake port 10 is located under and behind the cowl top 7, and sucks external air flowing into the cowl box 6.

Besides, an air conditioner (not illustrated) provided on an occupant compartment R's side of the dash panel 8 is configured to send the air sucked from the first air intake port 10 and flowing into the cowl box 6 toward the occupant compartment R.

The left and right cowl sides 11, 12 serving as the left and right side walls of a space inside the cowl box 6 are provided to the vehicle left and right sides of the cowl top 7, respectively. The left and right cowl sides 11, 12 according to the embodiment are formed of a resin member softer than the cowl top 7, and in the shape of a flat plate which extends in the up-down and front-rear directions. In this respect, for example, in a case where the cowl top 7 is formed of a polypropylene resin or the like, the left and right cowl sides 11, 12 may be formed of a silicone resin or the like which is more flexible than the polypropylene resin or the like.

A second air intake port 20 is formed in the cowl side 12 on an opposite side (vehicle right side) of the cowl top 7 in the vehicle width direction from the one side (vehicle left side) where the first air intake portion 10 is provided. The second air intake port 20 introduces the external air into under the cowl top 7.

As illustrated in FIG. 4, the second air intake port 20 in the right cowl side 12 according to the embodiment is formed of multiple holes 21 arranged in multiple vertical and horizontal lines.

In addition, in the right cowl side 12, multiple vertical ribs 12a extending in the up-down direction are formed between the multiple columns of holes 21 above the second air intake port 20.

Furthermore, lattice-shaped ribs 12b are formed behind the second air intake port 20 in the right cowl side 12.

Figure 5:
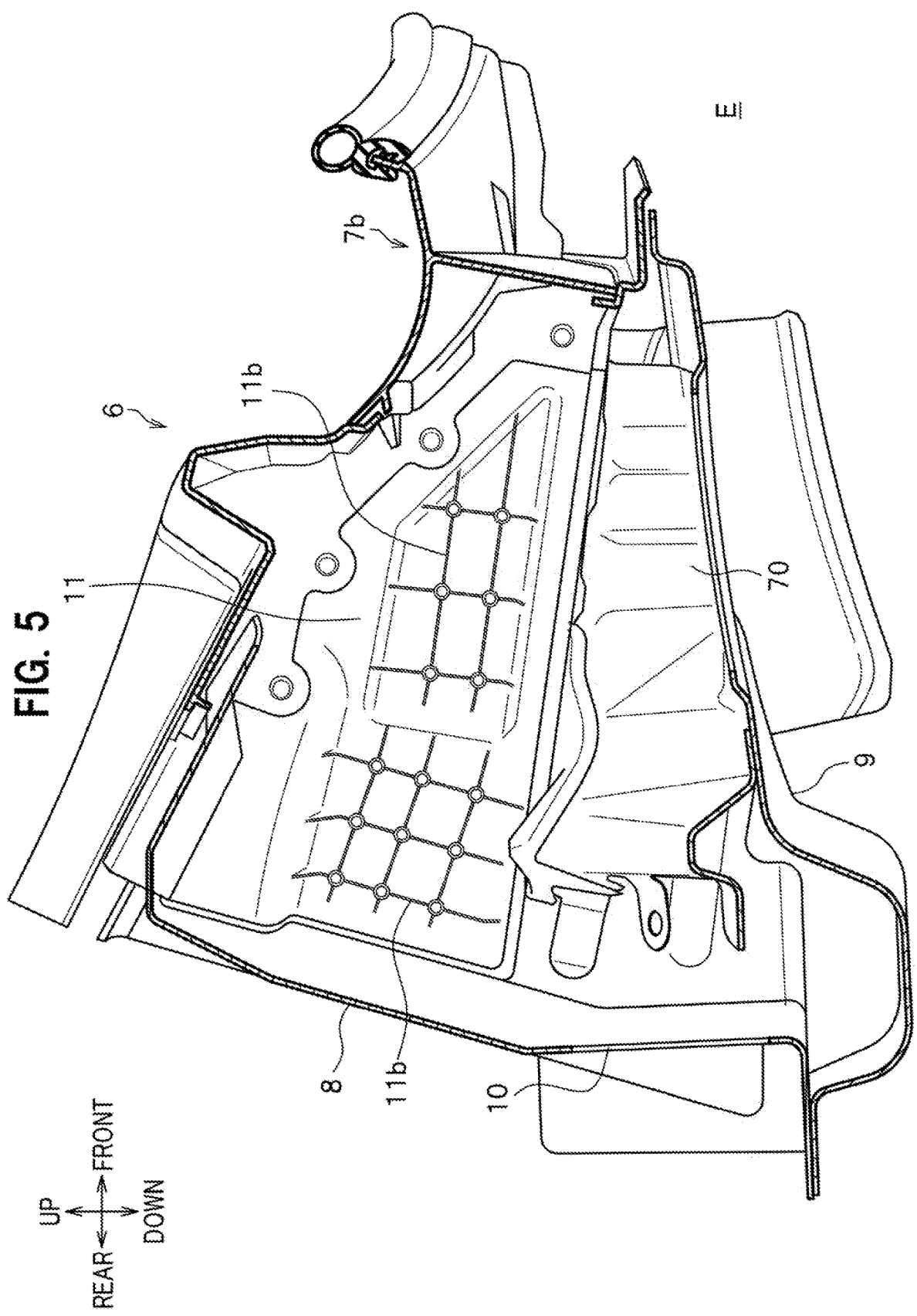
FIG. 5 is a cross-sectional view of the configuration of the cowl box in the cowl top structure according to the embodiment, taken along the V-V line of FIG. 2.

Moreover, as illustrated in FIG. 5, lattice-shaped ribs 11b, 11b are provided in the left cowl side 11. Thus, no air intake port is formed therein. In addition, a certain strength is set in the left and right cowl sides 11, 12 arranged in the left and right side surfaces of the cowl top 7. Thereby, the cowl top 7 can be supported by its two ends while securing desirable support rigidity.

Besides, as illustrated in FIG. 1, the engine room E serving as the power source compartment is provided in the vehicle body front in front of the front windshield 5. The upper surface of the engine room E is covered with the hood 4. An area above the second air intake port 20 provided in the cowl side 12 is covered with a rear portion of the hood 4.

The vehicle's right fender 2 is arranged outside the second air intake port 20 in the vehicle width direction. Meanwhile, the left fender 2 is arranged outside the cowl side 11 on the side of the first air intake port 10. Thus, areas outside the left and right side edge portions of the cowl box 6 are covered with the fenders 2, 2 constituting part of the vehicle body, and an area above the cowl box 6 is covered with a rear portion of the hood 4. The second air intake port 20 introduces the external air into the cowl box 6 from a space surrounded by the fender 2 and the rear portion of the hood 4.

Figure 3:
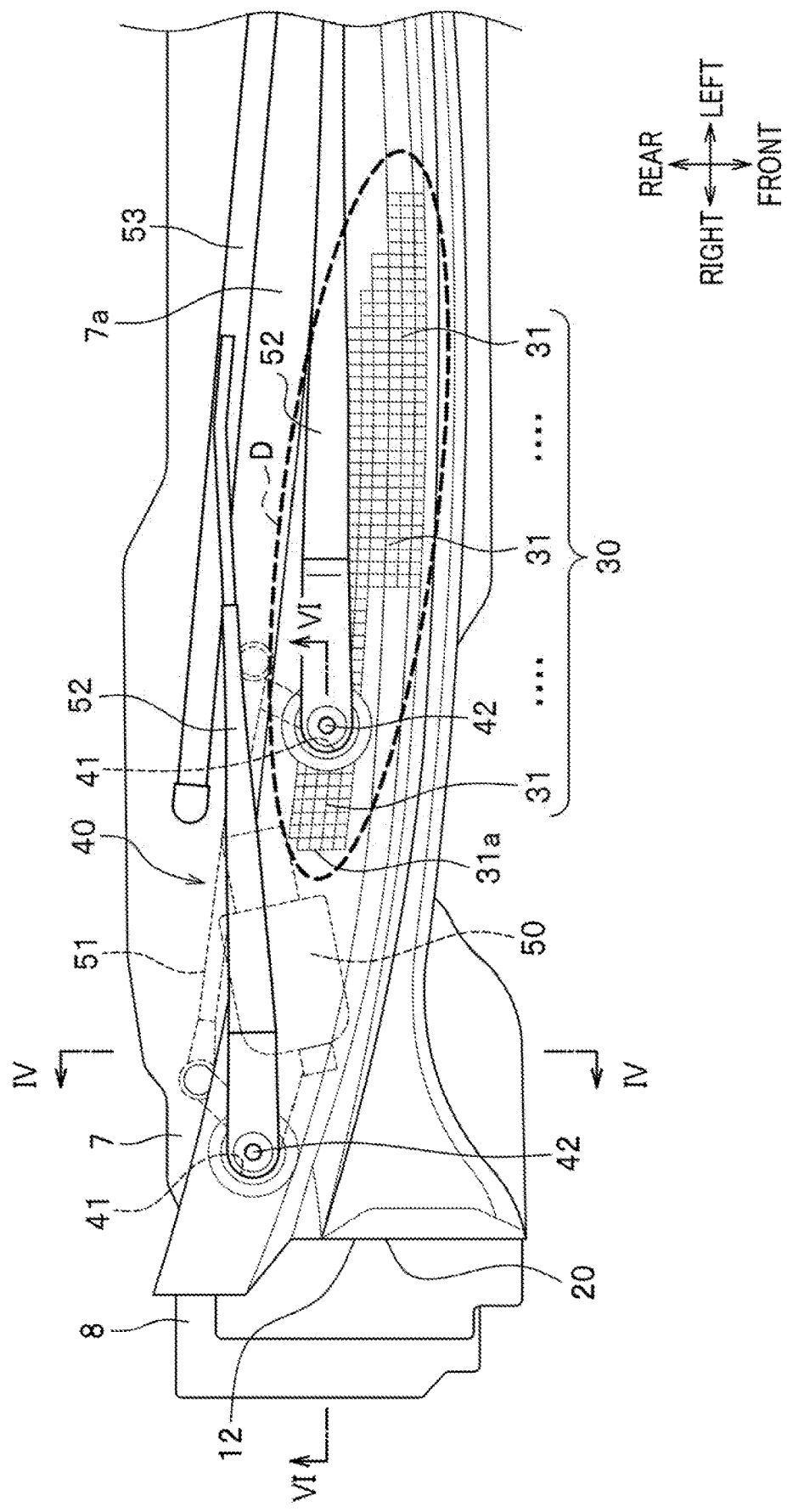
FIG. 3 is a schematic top view of how the cowl box in the cowl top structure according to the embodiment looks when viewed from above the vehicle in a direction indicated with an arrow III in FIG. 2.

In addition, as illustrated in FIG. 3, a third air intake port 30 is formed in the upper surface of the cowl top 7, and from multiple holes 31 arranging in multiple vertical and horizontal lines.

The holes 31 of the third air intake port 30 are arranged such that the number of holes 31 becomes smaller toward the one side (vehicle left side) in the vehicle width direction.

As illustrated in FIG. 1, the upper surface of the cowl top 7 in which the third air intake port 30 is formed has an inclined surface whose angle of inclination to the vehicle front becomes larger toward the one side (the left side) of the cowl top 7 in the vehicle width direction. The third air intake port 30 formed in the inclined surface are formed in a position which becomes lower while becoming more inclined to the vehicle front toward the vehicle right side.

For example, an inclination angle $\alpha 1$ of a portion of the inclined surface closer to the center of the cowl top 7 in the vehicle width direction to the vehicle front and an inclination angle $\alpha 2$ of a portion of the inclined surface closer to the right side of the cowl top 7 in the vehicle width direction to the vehicle front are made different from each other ($\alpha 1 < \alpha 2$). Thereby, the amount of inclination of the inclined surface is set to become larger toward the right side in the vehicle width direction.

Accordingly, water on the upper surface of the cowl top 7 is guided to flow rightward in the vehicle width direction so that a smaller amount of water flows leftward in the vehicle width direction.

Besides, the number of holes 31 of the third air intake portion 30 according to the embodiment becomes smaller toward the left side in the vehicle width direction. For this reason, in the left side in the vehicle width direction, water is less likely to flow to under the cowl top 7 from the holes 31.

Thus, even if there is water which flows from the third air intake portion 30 to under the cowl top 7, its amount is small. This makes it possible to reduce the amount of water which flows to the first air intake port 10 (the left side).

As illustrated in FIG. 3, the cowl top structure according to the embodiment includes a wiper unit 40. The wiper unit 40 includes a wiper motor 50, and a link mechanism 51 linked to the rotary shaft of the wiper motor 50 via a speed reduction mechanism (not illustrated), which are both arranged in a hollow space formed by the cowl top 7 and the dash panel 8.

Wiper arms 52 linked to the motor 50 via wiper shafts 42 linked to the link mechanism 51 are provided on the upper surface of the cowl top 7. Wiper blades 53 are attached to the respective wiper arms 52. The wiper blades 53 wipe the front windshield 5 by swinging corresponding to the swing of the wiper arms 52.

Furthermore, two shaft holes 41, 41 through which to insert the wiper shafts 42 are formed in their respective places on the cowl top 7 which are away from each other. The holes 31 are arranged in the upper surface of the cowl top 7 in a way that does not allow the holes 31 to overlap the shaft holes 41. Thereby, the third air intake port 30 includes the multiple holes 31 formed in a place which does not overlap the motor 50 in the top view.

The farthest end 31a of the holes 31 on the opposite side (right side) is located substantially in the middle between the two wiper shafts 42, 42.

Thus, as illustrated in FIG. 3, in the cowl top structure according to the embodiment, the holes 31 of the third air intake port 30 are formed in the place which does not overlap the motor 50 in the top view.

The thus-configured third air intake port 30 according to the embodiment complements the external air introduced from the second air intake port 20, and guides the external air to under the cowl top 7. Accordingly, the amount of external air inside the cowl box becomes sufficiently full, and enables air to be sufficiently taken in from the first air intake port 10.

Figure 6:
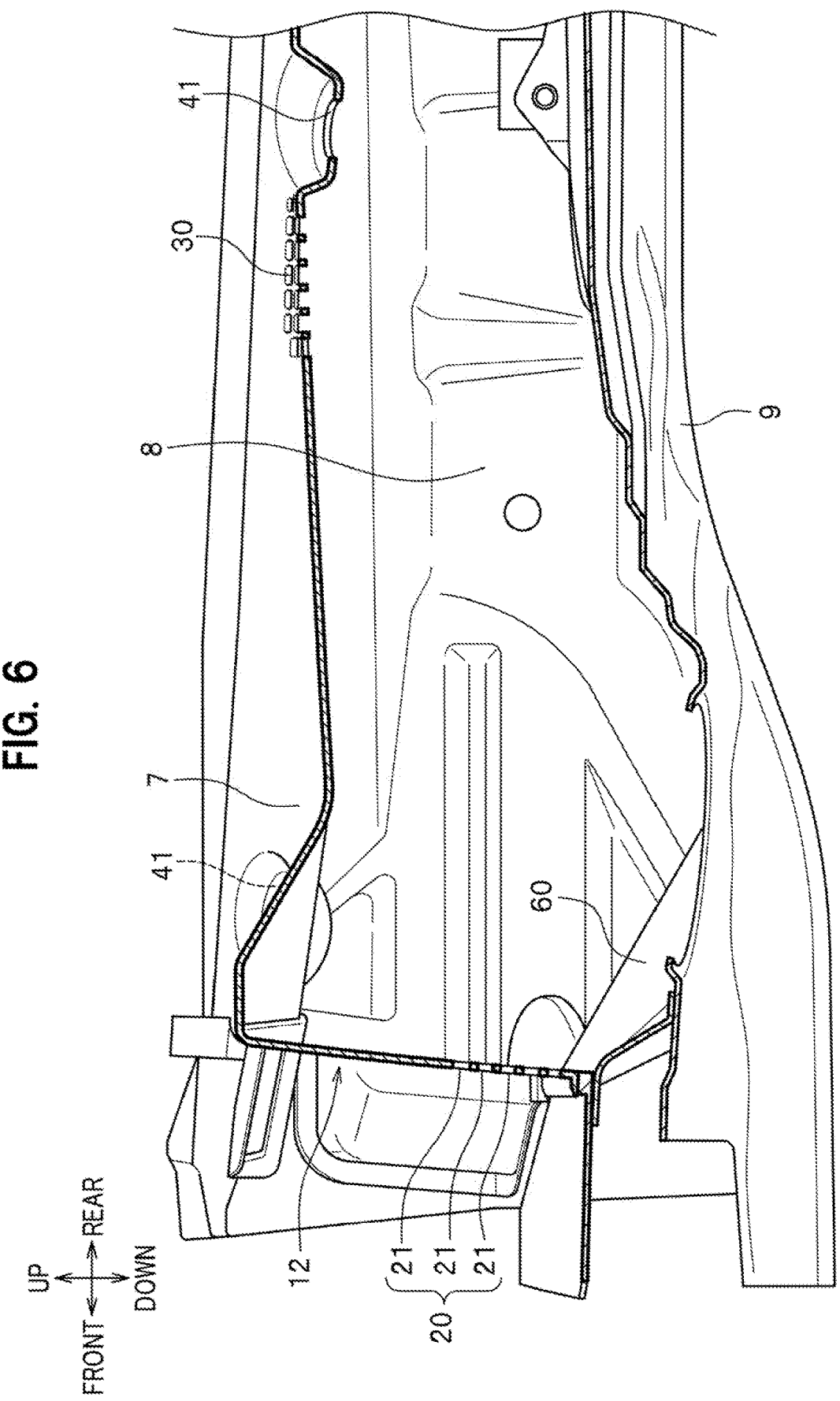
FIG. 6 is a cross-sectional view of the configuration of the cowl box in the cowl top structure according to the embodiment, taken along the VI-VI line of FIG. 3.

As illustrated in FIG. 4, the right cowl side 12 according to the embodiment includes an inclined wall 60 whose upper surface is formed in the shape of a flat plate, and which inclines such that the inclined wall 60 becomes more inside in the vehicle width direction toward its bottom (see FIG. 6). The second air intake port 20 is arranged above the inclined wall 60.

In addition, as illustrated in FIG. 5, the left cowl side 11 according to the embodiment includes an inclined wall 70 whose upper surface is formed in the shape of a flat plate, and which inclines such that the inclined wall 70 becomes more inside in the vehicle width direction toward its bottom.

For these reason, even if water flowing to under the cowl top 7 moves inside the cowl box 6 toward the inclined walls 60, 70, energy of the water can be dampened because the water is forced to climb the inclined walls 60, 70 before the water hits the cowl sides 11, 12.

Next, descriptions will be provided for working and effects of the cowl top structure according to the embodiment.

As illustrated in FIG. 1, the cowl top structure of the vehicle 1 according to the embodiment includes: the cowl top 7 arranged on the lower end part 5a of the front windshield 5; the dash panel 8 constituting part of the vehicle body, and provided with the first air intake port 10 for sucking the external air which is arranged under and behind the cowl top 7 and on the one side of the cowl top 7 in the vehicle width direction; and the hood 4 arranged in front of the dash panel 8 and above the engine room E.

The cowl top structure further includes: the fenders 2 arranged on the respective sides of the cowl top 7; and the right cowl side 12 extending the up-down and front-rear directions, and arranged on the opposite side of the cowl top 7 in the vehicle width direction.

In addition, the cowl side 12 includes the second air intake port 20 for introducing the external air to under the cowl top 7. Furthermore, the hood 4 is arranged above the second air intake port 20, and the fender 2 is arranged outside the second air intake port 20 in the vehicle width direction.

In the thus-configured cowl top structure according to the embodiment, the second air intake port 20 is provided in the cowl side 12 on the opposite side from the first air intake port 10 in the vehicle width direction. This makes it possible to arrange the second air intake port 20 and the first air intake port 10 on the respective right and left sides of the cowl box 6 forming the ventilation flow channel whose longitudinal direction coincides with the vehicle width direction, such that the second air intake port 20 is distant from the first air intake port 10. Thus, the water flowing in from the second air intake port 20 can be prevented from entering the first air intake port 10.

In addition, the second air intake port 20 introduces the external air to under the cowl top 7 from the space which is defined by the hood 4 and the fenders 2 respectively arranged above and on the sides of the space. As illustrated in FIG. 4, the second air intake port 20 is provided in the upper portion of the cowl side 12 extending in the up-down and front-rear directions, such that the second air intake port 20 is adjacent to the cowl top 7. Thus, the water can be more prevented from entering there.

Furthermore, as illustrated in FIG. 4, the second air intake port 20 are formed of the multiple holes 21. The vertical ribs 12a extending in the up-down direction are arranged between the multiple holes 21.

The forming of the second air intake port 20 from the multiple holes 21 makes it possible to suck the air while suppressing water and dust from flowing to under the cowl top 7. In addition to this, if an obstacle hits the cowl top 7, the cowl side 12 can absorb the hitting load by being deformed while dispersing the load to the frames of the multiple holes 21.

Moreover, the arranging of the vertical ribs 12a between the multiple holes 21 makes it possible to increase rigidity to the deformation of the right cowl side 12 beyond its surface, and to secure supporting rigidity of the cowl top 7. Meanwhile, the left cowl side 11 illustrated in FIG. 5 where no such opening as the second air intake port 20 is formed is provided with the lattice-shaped ribs 11b, 11b. This sets a certain strength in the left cowl side 11. Accordingly, desirable supporting rigidity for supporting the cowl top 7 is secured by the left and right cowl sides 11, 12 respectively on the two sides which support the cowl top 7.

Besides, as illustrated in FIG. 5, the cowl side 11 on the one side in the vehicle width direction where the first air intake port 10 is arranged is formed of the resin member which is softer than the cowl top 7, and the lattice-shaped ribs 11b, 11b are arranged on the inner side surface of the resin member in the vehicle width direction.

Since the cowl side 11 on the one side (left side) in the vehicle width direction where the first air intake port 10 is arranged is formed of the soft resin member, the cowl side 11 can absorb the load when an obstacle hits the cowl top 7. In addition, since the lattice-shaped ribs 11b, 11b are provided on the inner side surface of the resin member in the vehicle width side, the supporting rigidity for supporting the cowl top 7 can be secured.

Furthermore, as illustrated in FIG. 3, the motor 50 for the wiper unit 40 is arranged in the hollow space inside the cowl box 6 including the cowl top 7 and the dash panel 8.

On the upper surface of the cowl top 7, the third air intake port 30 formed of the multiple holes 31 is provided in the place which does not overlap the motor 50 in the top view.

Moreover, the third air intake port 30 is arranged such that the number of holes 31 becomes smaller toward the one side in the vehicle width direction.

As discussed above, the third air intake port 30 is arranged, on the upper surface of the cowl top 7, in the place which does not overlap the motor 50. This makes it possible for the third air intake port 30 to suck the air while preventing water from splashing onto the motor 50.

Besides, since the number of holes 31 becomes smaller toward the one side (left side) in the vehicle width direction, water can be preventing from entering the first air intake port 10.

In the embodiment, as illustrated in FIG. 3, outer shapes of the holes 31 of the third air intake port 30 become more curved to the vehicle front, and the number of holes 31 becomes smaller, toward the one side (left side) in the vehicle width direction. Thus, in the top view, the multiple holes 31 of the third air intake port 30 concentrate in the shape of an oblong ellipse.

This makes the number of holes 31 smaller in both the left and right sides in the vehicle width direction. Thus, water can be effectively prevented from entering the first air intake port 10.

In addition, in the cowl top structure according to the embodiment, as illustrated in FIG. 1, the third air intake port 30 is formed in the inclined surface of the cowl top 7 which becomes more inclined to the vehicle front toward the opposite side of the cowl top 7 in the vehicle width direction.

Since in the top view, the outer shapes of the holes 31 of the third air intake port 30 become more inclined to the vehicle front, and the number of holes 31 becomes smaller, toward the one side (the left side) in the vehicle width direction, the water flowing in from the third air intake port 30 flows down toward the cowl front 13 due to the inclined surface, and therefore can be effectively prevented from entering the first air intake port 10 which is formed in the dash panel 8.

Moreover, in the embodiment, as illustrated in FIGS. 4 to 6, the cowl sides 11, 12 are respectively provided with the inclined walls 60, 70 which incline such that the inclined walls 60, 70 become more inside the vehicle width direction toward their bottoms. In addition, the second air intake port 20 is arranged above the inclined wall 70.

For this reason, even if water moves inside the cowl box 6 toward the inclined walls 60, 70, energy of the water can be dampened since the water is forced to climb the inclined walls 60, 70 before the water hits the cowl sides 11, 12.

For example, let us assume that water moves inside the cowl box 6 in the vehicle width direction when the vehicle is steered. The inclined wall 70 can suppress splash of the water in a way that does not allow the water to get close to the second air intake port 20.

Furthermore, water is prevented from hitting the left and right cowl sides 11, 12 and being swirled up. Thus, the swirled-up water can be prevented from entering the first air intake port 10 due to the flow of air sucked from the second air intake port 20.

The present invention is not limited to the above-discussed embodiment, and can be variously modified. The foregoing embodiment has been exemplified for the purpose of explaining the present invention in an easy-to-understand way, and is not necessarily limited to what includes all the discussed components. In addition, an embodiment may be created based on one embodiment by replacing some of its components with some of the components of another embodiment, or by adding some of the components of another embodiment. Otherwise, an embodiment may be created based on one embodiment by removing some of its components, or by replacing or adding some of its components with or to some of the components of another embodiment. Examples of feasible modifications to the foregoing embodiment are as follows.

The embodiment has been described while showing the engine room E as the power source compartment, but the compartment is not specifically to this. The compartment may be of any type as long as it is a motor compartment containing a motor of an electric vehicle as a power source, a compartment provided with both an engine and a motor, or a compartment located in the vehicle body front with the hood 4 arranged over the compartment in a case of an engineless vehicle or the like.

In addition, in the embodiment, as illustrated in FIG. 1, the first air intake port 10 serving as the air conduct opening is provided on the one side (vehicle left side) of the dash panel 8 in the vehicle width direction, and the right cowl side 12 in which the second air intake port 20 is formed is provided on the opposite side (vehicle right side) in the vehicle width direction. The embodiment, however, is not limited to this configuration.

For example, a configuration may be employed in which: the one side of the dash panel 8 in the vehicle width direction is the vehicle right side, and the first air intake port 10 is provided there; the opposite side in the vehicle width direction is the vehicle left side, and the left cowl side 12 in which the second air intake port 20 is formed is provided there. In other words, the second air intake port 20 from which to introduce the external air may be formed in the cowl side 12 on the opposite side from the first air intake port 10, as well as the shapes or materials of the first, second and third air intake ports 10, 20, 30, or the numbers of first, second and third air intake ports 10, 20, 30 to be included in the cowl top structure are not limited to the foregoing embodiment.

What is claimed is:

1. A cowl top structure comprising:
   a cowl top arranged on a lower end part of a front windshield;
   a vehicle body provided with a first air intake port for sucking external air under and behind the cowl top, and on one side of the cowl top in a vehicle width direction;
   a hood arranged in a front of the vehicle body, and above a power source compartment;
   a fender arranged on a side of the cowl top; and
   a cowl side extending in up-down and front-rear directions on another side of the cowl top in the vehicle width direction, wherein
   the cowl side includes a second air intake port for introducing the external air to under the cowl top,
   the hood is arranged above the second air intake port,
   the fender is arranged outside the second air intake port in the vehicle width direction,
   the cowl side on the one side in the vehicle width direction where the first air intake port is arranged is formed of a resin member softer than the cowl top, and
   a lattice-shaped rib is arranged on an inner side surface of the resin member in the vehicle width direction.

2. The cowl top structure according to claim 1, wherein the second air intake port is formed of a plurality of holes, and
   ribs extending in the up-down direction are arranged between the plurality of holes.

3. The cowl top structure according to claim 1, further comprising:
   a motor for a wiper arranged in a hollow space formed under the cowl top; and
   a third air intake port formed of a plurality of holes in a place which does not overlap the motor in a top view in an upper surface of the cowl top, wherein
   the third air intake port is arranged such that the number of holes becomes smaller toward the one side in the vehicle width direction.

4. The cowl top structure according to claim 3, wherein the third air intake port is formed in an inclined surface which becomes more inclined to a vehicle front toward the one side in the vehicle width direction.

5. A cowl top structure comprising:
   a cowl top arranged on a lower end part of a front windshield;
   a vehicle body provided with a first air intake port for sucking external air under and behind the cowl top, and on one side of the cowl top in a vehicle width direction;
   a hood arranged in a front of the vehicle body, and above a power source compartment;
   a fender arranged on a side of the cowl top; and
   a cowl side extending in up-down and front-rear directions on another side of the cowl top in the vehicle width direction, wherein
   the cowl side includes a second air intake port for introducing the external air to under the cowl top,
   the hood is arranged above the second air intake port,
   the fender is arranged outside the second air intake port in the vehicle width direction,
   the cowl side includes an inclined wall which inclines such that the inclined wall becomes more inside in the vehicle width direction toward its bottom, and
   the second air intake port is arranged above the inclined wall.

6. The cowl top structure according to claim 5, wherein
the second air intake port is formed of a plurality of holes, and
ribs extending in the up-down direction are arranged between the plurality of holes.

7. The cowl top structure according to claim 5, wherein
the cowl side on the one side in the vehicle width direction where the first air intake port is arranged is formed of a resin member softer than the cowl top, and
a lattice-shaped rib is arranged on an inner side surface of the resin member in the vehicle width direction.

8. The cowl top structure according to claim 2, wherein
the cowl side on the one side in the vehicle width direction where the first air intake port is arranged is formed of a resin member softer than the cowl top, and
a lattice-shaped rib is arranged on an inner side surface of the resin member in the vehicle width direction.

9. The cowl top structure according to claim 6, wherein
the cowl side on the one side in the vehicle width direction where the first air intake port is arranged is formed of a resin member softer than the cowl top, and
a lattice-shaped rib is arranged on an inner side surface of the resin member in the vehicle width direction.

10. The cowl top structure according to claim 5, further comprising:
a motor for a wiper arranged in a hollow space formed under the cowl top; and
a third air intake port formed of a plurality of holes in a place which does not overlap the motor in a top view in an upper surface of the cowl top, wherein
the third air intake port is arranged such that the number of holes becomes smaller toward the one side in the vehicle width direction.

11. The cowl top structure according to claim 2, further comprising:
a motor for a wiper arranged in a hollow space formed under the cowl top; and
a third air intake port formed of a plurality of holes in a place which does not overlap the motor in a top view in an upper surface of the cowl top, wherein
the third air intake port is arranged such that the number of holes becomes smaller toward the one side in the vehicle width direction.

12. The cowl top structure according to claim 6, further comprising:
a motor for a wiper arranged in a hollow space formed under the cowl top; and
a third air intake port formed of a plurality of holes in a place which does not overlap the motor in a top view in an upper surface of the cowl top, wherein
the third air intake port is arranged such that the number of holes becomes smaller toward the one side in the vehicle width direction.

13. The cowl top structure according to claim 7, further comprising:
a motor for a wiper arranged in a hollow space formed under the cowl top; and
a third air intake port formed of a plurality of holes in a place which does not overlap the motor in a top view in an upper surface of the cowl top, wherein
the third air intake port is arranged such that the number of holes becomes smaller toward the one side in the vehicle width direction.

14. The cowl top structure according to claim 8, further comprising:
a motor for a wiper arranged in a hollow space formed under the cowl top; and
a third air intake port formed of a plurality of holes in a place which does not overlap the motor in a top view in an upper surface of the cowl top, wherein
the third air intake port is arranged such that the number of holes becomes smaller toward the one side in the vehicle width direction.

15. The cowl top structure according to claim 9, further comprising:
a motor for a wiper arranged in a hollow space formed under the cowl top; and
a third air intake port formed of a plurality of holes in a place which does not overlap the motor in a top view in an upper surface of the cowl top, wherein
the third air intake port is arranged such that the number of holes becomes smaller toward the one side in the vehicle width direction.

16. The cowl top structure according to claim 10, wherein
the third air intake port is formed in an inclined surface which becomes more inclined to a vehicle front toward the one side in the vehicle width direction.

17. The cowl top structure according to claim 11, wherein
the third air intake port is formed in an inclined surface which becomes more inclined to a vehicle front toward the one side in the vehicle width direction.

18. The cowl top structure according to claim 12, wherein
the third air intake port is formed in an inclined surface which becomes more inclined to a vehicle front toward the one side in the vehicle width direction.

19. The cowl top structure according to claim 13, wherein
the third air intake port is formed in an inclined surface which becomes more inclined to a vehicle front toward the one side in the vehicle width direction.

20. The cowl top structure according to claim 14, wherein
the third air intake port is formed in an inclined surface which becomes more inclined to a vehicle front toward the one side in the vehicle width direction.

* * * * *